Figure 1:
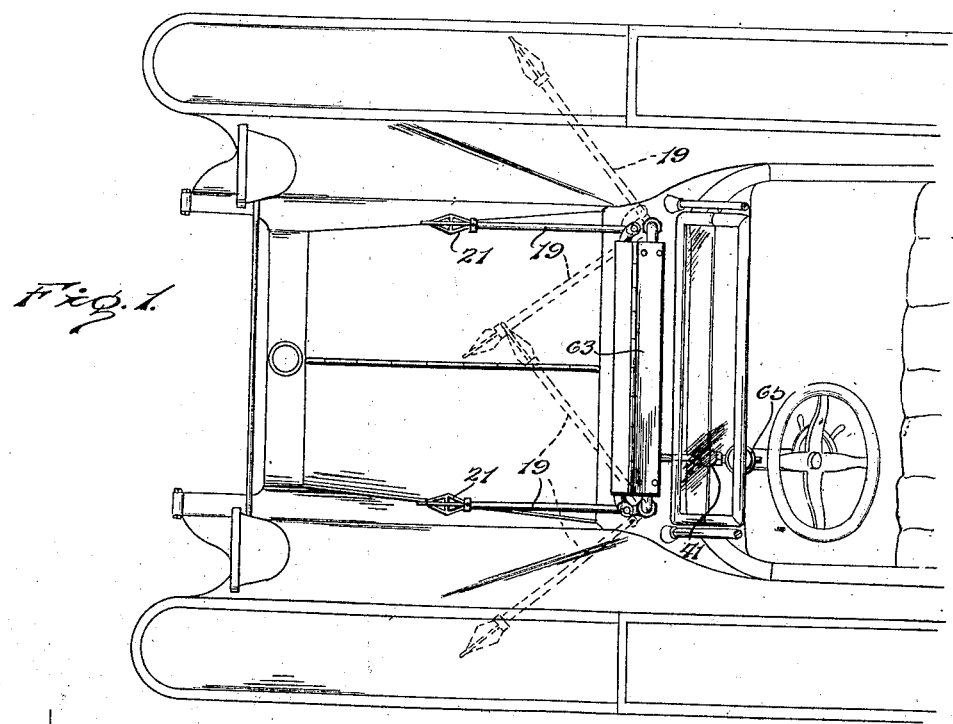

Feb. 23, 1926.

W. L. MERRICK 1,574,162

TRAFFIC SIGNAL

Filed Jan. 9, 1924  3 Sheets-Sheet 1

Inventor

W. L. Merrick

By Lacy & Lacy, Attorney.

Feb. 23, 1926.
W. L. MERRICK
TRAFFIC SIGNAL
Filed Jan. 9, 1924
1,574,162
3 Sheets-Sheet 2

Inventor
W. L. Merrick

By
Lacy & Lacy, Attorneys

Feb. 23, 1926.                                                          1,574,162
                         W. L. MERRICK
                         TRAFFIC SIGNAL
                       Filed Jan. 9, 1924            3 Sheets-Sheet 3
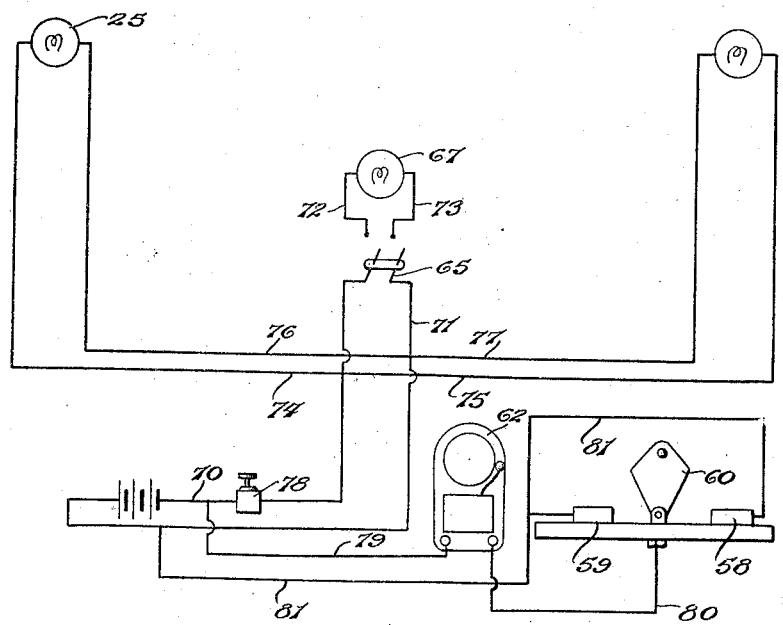
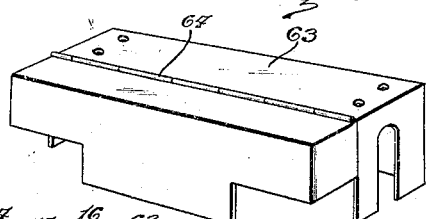
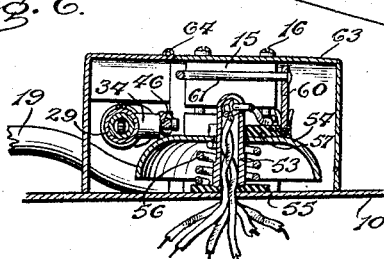
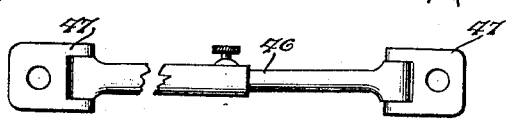
Inventor
W. L. Merrick
By Lacy & Lacy, Attorneys Patented Feb. 23, 1926.

1,574,162

UNITED STATES PATENT OFFICE.

WILLIAM LOUIS MERRICK, OF HALIFAX, CANADA.

TRAFFIC SIGNAL.

Application filed January 9, 1924. Serial No. 685,266.

*To all whom it may concern:*

Be it known that I, WILLIAM LOUIS MERRICK, subject of the King of Great Britain, residing at Halifax, in the Province of Nova Scotia and Dominion of Canada, have invented certain new and useful Improvements in Traffic Signals, of which the following is a specification.

This invention relates to an improved traffic signal for motor vehicles and seeks, among other objects, to provide a signal which may be easily and quickly operated manually by the driver of a vehicle for indicating an intention to turn either to the right or left or proceed straight ahead.

The invention seeks, as a further object, to provide a signal embodying a pair of signal arms to project forwardly over the hood of the vehicle engine and wherein means will be provided for manually swinging the arms simultaneously.

The invention seeks, as another object, to provide a signal embodying means for yieldably locking the arms when swung so that said arms will remain in set position until manually shifted.

Another object of the invention is to provide a signal embodying illuminating means for the signal arms.

A still further object of the invention is to provide a signal embodying an annunciator and wherein, when the arms are swung either to the right or left for signaling an intention to turn, the annunciator will be sounded.

And the invention seeks, as a still further object, to provide a signal which may be readily installed and used in connection with vehicles of different conventional makes.

Other and incidental objects will appear hereinafter.

Figure 2:
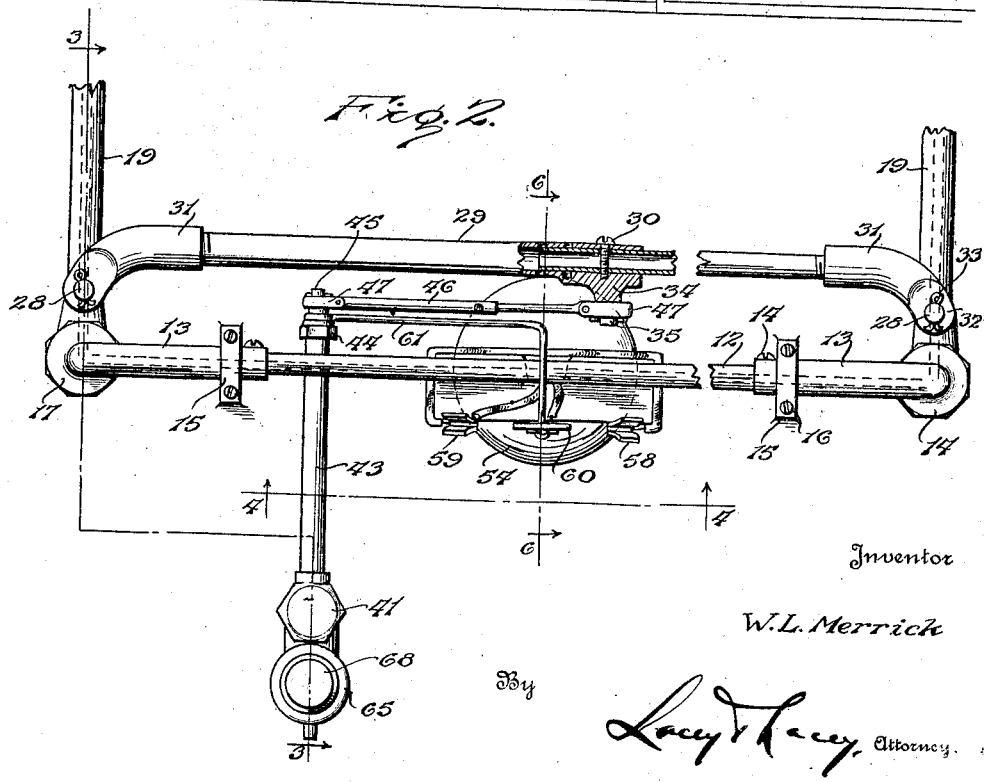
Figure 3:
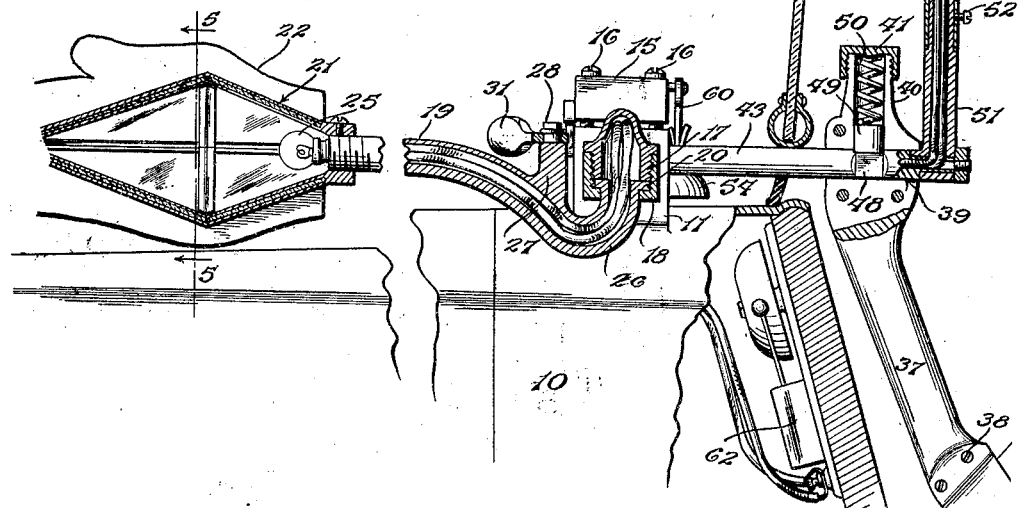
Figure 4:
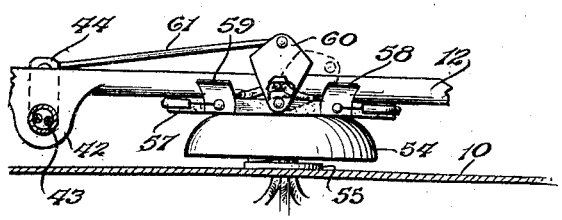
Figure 5:
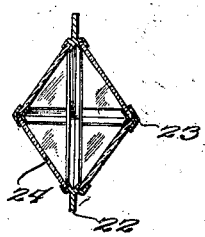

In the drawings:

Figure 1 is a plan view showing my improved signal applied to a conventional motor vehicle, Figure 2 is a fragmentary enlarged plan view particularly showing the mounting of the signal arms as well as the annunciator switch employed, the housing for these parts being removed, Figure 3 is an enlarged vertical sectional view on the line 3—3 of Figure 2, looking in the direction of the arrows, Figure 4 is a fragmentary sectional view on the line 4—4 of Figure 2, looking in the direction of the arrows, Figure 5 is a detail sectional view on the line 5—5 of Figure 3, looking in the direction of the arrows, Figure 6 is a detail sectional view on the line 6—6 of Figure 2, looking in the direction of the arrows, Figure 7 is a detail perspective view of the housing employed, Figure 8 is a detail plan view showing the pitman employed, and Figure 9 is a diagrammatic view of the wiring system.

In order to clearly bring out the mounting and operation of my improved signal, I have, for convenience, shown the device in connection with a conventional motor vehicle. The cowl of the vehicle is indicated at 10 and formed on or otherwise secured to the cowl, in accordance with the present improvements, are upstanding posts 11. Associated with said posts is a tubular cross rod 12 which is formed of a plurality of sections comprising end sections or sleeves 13 slidably fitting over the ends of the intermediate section of the rod. Thus, the sleeves 13 may be adjusted for lengthening or shortening the rod to suit the requirements of different vehicles and securing the sleeves in adjusted position are set screws 14. At their upper ends, the posts 11 are recessed to snugly receive the sleeves 13 and bearing over said sleeves are clamping blocks 15 connected with the posts by binding screws 16. Formed on the sleeves at their outer ends are, as best shown in Figure 3, depending heads 17 upon which are screwed collars 18 and swiveled upon said collars is a pair of tubular signal arms 19 provided at their inner ends with flanges 20 bearing within the collars. Thus, the signal arms are supported to extend horizontally above the engine hood of the vehicle and screwed upon the arms at their outer ends are signal casings 21 each mounting a web or indicator 22 shaped to represent a hand. The casings 21 are preferably of the shape shown in Figures 3 and 5 of the drawings and each comprises a skeleton frame 23 between the bars of which are arranged suitable transparencies 24, and appropriately mounted at the outer ends of the arms 19 are signal lamps 25 housed by said casings.

At the inner ends, the arms 19 are formed with elbows 26 to extend upwardly into the collars 18 and rising from the arms at the forward end portions of said elbows are posts 27 terminating in upstanding studs 28. Extending between the arms is a preferably tubular connecting rod 29. As brought out in Figure 2, this rod is formed of telescopic sections so that said rod, like the rod 12, may be either lengthened or shortened to suit the requirements of different vehicles and securing the sections of the rod in adjusted position is a locking screw 30. Screwed upon the extremities of the rod are elbow-shaped sleeves 31 terminating in flattened lugs 32 fitting over the studs 28 of the posts 27 and securing the sleeves against displacement are cotter pins or other suitable fastening devices 33 engaged through the studs. Thus, the rod 29 will serve to connect the signal arms 19 to swing in unison and formed on one of the sections of the rod is a rearwardly directed post 34 terminating in a stud 35.

Clamped upon the steering post 36 of the vehicle is a bracket 37 which is preferably split from end to end and is secured about the steering post by bolts or other suitable fastening devices 38. At its upper end the bracket is formed with a bearing 39 from which rises a nipple 40 and screwed upon said nipple is a cap 41. The cross rod 12 of the device is, as shown in Figure 4, provided with a depending lug 42 and journaled through said lug and through the bearing 39 of the bracket 37 is a hollow control shaft 43 extending beneath the wind shield of the vehicle. Fixed upon the forward end of said shaft is a crank 44 carrying a crank pin 45 and connecting the crank with the post 34 of the connecting rod 29 is a lineally adjustable pitman 46 carrying, as shown in detail in Figure 8, pivoted bearings 47, one fitting over the crank pin 45 and the other fitting over the stud 35 of said post. Near its rear end, the shaft 43 is provided, as shown in Figure 3, with flat faces 48 and slidable in the nippple 40 of the bearing 39 to cooperate with said faces of the shaft is a detent 49 actuated by a spring 50 confined by the cap 41 of said nipple. Removably fixed upon the rear end of the shaft is a lever 51. This lever is of preferably tubular construction and is formed of telescopic sections so that the lever may be lengthened or shortened to suit the requirements of different cars, and securing the sections of the lever in adjusted position is a set screw 52.

As will now be seen in view of the foregoing, the lever 51 may be grasped and rocked to the right, for instance, when the signal arms 19 will be swung to the right hand dotted line position shown in Figure 1, for signaling an intention of the driver to turn in that direction. On the other hand, by rocking the lever to the left, the signal arms may be swung to the left hand dotted line position shown in Figure 1, for indicating the intention of the driver to turn in the opposite direction. When the signal arms are thus swung either to the right or left, one of the flat faces 48 of the shaft 43 will be brought to a position beneath the detent 49 so that said detent will, under the influence of the spring 50, seat against such face, for yieldably locking the signal arms in set position. Likewise, when the lever 51 is brought to a vertical position and the signal arms 19 are, as shown in full lines in Figure 1, disposed to point straight ahead, the detent 49 will seat against one of the flat faces of the shaft 43 for yieldably locking the signal arms inactive.

Depending from the cross rod 12 of the device is, as shown in detail in Figure 6, a center tube 53 over which is fitted a bell-shaped hood 54 while between the lower end of said tube and the cowl 10 of the vehicle is arranged a gasket 55. Bearing between said gasket and the hood is a spring 56 and clamped between the hood and the cross rod is an insulating block 57 notched at its forward longitudinal edge to accommodate said tube. Fixed to the rear longitudinal edge of the block are contact fingers 58 and 59 and pivoted upon the block between said fingers is a switch blade 60. Journaled at one end upon the crank pin 45 of the crank 44 is a switch rod 61 which is bent to extend rearwardly above the cross rod 12 and is connected to the switch plate 60. Thus, when the signal arms 19 are swung to the right, as previously described, the blade 60 will be rocked into engagement with the switch fingers 58 while, when the signal arms are swung to the left, the switch blade will be swung into engagement with the switch fingers 59. As shown in Figure 3, I employ, in conjunction with the switch, a suitable annunciator 62 which may, as suggested, be mounted upon the dash of the vehicle or at any other approved location thereon. This annunciator is electrically connected with the switch fingers 58 and 59 as shall be presently explained and for protecting the switch as well as adjacent parts of the signal, I employ a housing 63. As shown in detail in Figure 7, the housing is oblong in shape to extend longitudinally of the cross rod 12 over the posts 11 and is notched at its ends to receive said cross rod while the top wall of the housing is apertured to accommodate the securing screws 16 for the caps 15 of said posts so that said screws also serve to secure the housing in place. Further, the back wall of the housing is, of course, notched to accommodate the shaft 43 and preferably, the front portion of the housing which extends over the connecting rod 29, is hinged as indicated at 64, said front portion of the housing being cut away at its ends to accommodate the swinging movement of the arms 19.

Mounted upon the lever 51 is an appropriate switch 65 in the upper end of the casing of which is arranged a socket 66 mounting a pilot lamp 67 and screwed into the upper end of the switch casing is a hood 68 housing the lamp and provided at opposite sides thereof with relatively small light openings 69. The hood 68 is, of course, provided so that the light from the lamp 67 will not annoy the driver of the vehicle while, at the same time, said hood will serve to house and protect the lamp. As shown in Figure 3, suitable circuit wires are led through the lever 51 to the switch 65 and pilot lamp 67. Likewise, circuit wires are, as shown in Figure 6, led through the cowl 10 of the vehicle and through the tube 53 into the cross rod 12 to emerge from said rod to the switch fingers 58 and 59 as well as to continue through the rod and through the signal arms 19 to the lamps 25. In Figure 9 of the drawings, I have diagrammatically shown the manner in which the lamps of the device as well as the switch 65 and annunciator 62 are electrically connected. As illustrated, a wire 70 is led from the battery or other suitable source of electrical energy upon the vehicle to one side of the switch 65 and connecting the opposite side of the switch with the battery is a return wire 71 while wires 72 and 73 are provided to connect the switch with the lamp 67. Leading from the wire 70 are wires 74 and 75 connected to corresponding terminals of the lamps 25 and leading from opposite corresponding terminals of said lamps are return wires 76 and 77 connected to the wire 71. Interposed in the wire 70 is a master switch 78 which, as will be seen, may be operated for breaking a circuit through the lamps 25 as well as through the lamp 67 so that in the daytime said lamps may be extinguished. On the other hand, when the switch 78 is closed, the lamps 25 will be energized. Accordingly, at night, the signal casings 21 and indicators 22 may be illuminated. After the switch 78 has been closed, the switch 65 may then be closed when the pilot lamp 67 will be energized, this lamp being provided for testing as to whether or not the system is functioning properly. Leading from the wire 70 at a point between the battery and the master switch 78 is a wire 79 connected to one side of the annunciator 62 and leading from the opposite side of said annunciator to the switch blade 60 is a wire 80. Leading from the switch fingers 58 and 59 is a return wire 81 connected to the return wire 71. A circuit is thus provided through the annunciator and through the switch blade 60 independent of the circuit of the lamps 25 so that when the switch blade is rocked into engagement with the switch fingers 58 or into engagement with the switch fingers 59, the annunciator will be caused to sound regardless of whether or not the circuit through the lamps 25 is closed. Engagement of the switch blade 60 with the switch fingers 58, when the signal arms 19 are swung to the right as previously described, will, therefore, effect sounding of the annunciator and likewise, the annunciator will be sounded upon engagement of the switch blade 60 with the switch fingers 59, when the signal arms are swung to the left.

Having thus described the invention, what is claimed as new is:

1. In a traffic signal for vehicles, the combination of a fixed cross rod to extend transversely of the vehicle, forwardly extending horizontal signal arms swiveled at their inner ends upon the ends of said rod and movable to project toward either one side or the other of the vehicle, means coupling said arms to swing in unison, and means for swinging said arms.

2. In a traffic signal for vehicles, the combination of a fixed cross rod to extend transversely of the vehicle, forwardly extending horizontal signal arms swiveled at their inner ends upon the ends of said rod and movable to project toward either one side or the other of the vehicle, means coupling said arms to swing in unison, a rotatable control shaft, a crank carried by said shaft, and a pitman connecting said crank with said coupling means whereby the shaft may be turned for swinging said arms.

3. In a traffic signal for vehicles, the combination of a fixed cross rod to extend transversely of the vehicle and provided at its ends with heads, horizontal signal arms normally projecting forwardly with respect to said rod, collars screwed upon said heads to form swivel connections between the inner ends of the arms and said rod and supporting the arms for movement to project toward either one side or the other of the vehicle, means coupling the arms to swing in unison, and means associated with said coupling means for swinging the arms.

4. In a traffic signal for vehicles, the combination of a fixed cross rod to extend transversely of the vehicle, companion forwardly projecting horizontal signal arms swiveled at their inner ends upon the ends of the rod and movable to project toward either one side or the other of the vehicle, means connecting the arms to swing in unison, operating means for swinging the arms including a rotatable shaft having flat faces, and a spring pressed detent bearing against said shaft to selectively coact with the flat faces thereof for locking the arms when swung.

5. In a traffic signal for vehicles, the combination of a fixed cross rod to extend transversely of the vehicle, companion forwardly projecting horizontal signal arms swiveled at their inner ends upon the ends of said rod to normally project forwardly adjacent opposite sides of the vehicle, means coupling the arms to swing in unison toward either one side or the other of the vehicle, a rotatable operating shaft having a crank thereon, and a pitman extending between said crank and said coupling means for swinging the arms, said pitman being formed of lineally adjustable sections.

6. In a traffic signal for vehicles, the combination of a fixed cross rod to extend transversely of the vehicle, companion forwardly projecting horizontal signal arms swiveled at their inner ends upon the ends of said rod and movable to project toward either one side or the other of the vehicle, means connecting the arms to swing in unison, operative means for swinging the arms including a rotatable shaft having flat faces, a bracket rotatably supporting said shaft and terminating at its upper end in a nipple, a spring pressed detent freely accommodated in said nipple to bear against said shaft and selectively coact with the flat faces thereof for locking the arms when swung, and a cap closing said nipple.

7. In a traffic signal for vehicles, the combination of a fixed cross rod to extend transversely of the vehicle, forwardly extending horizontal signal arms swiveled at their inner ends upon the ends of said rod and movable to project toward either one side or the other of the vehicle, means coupling said arms to swing in unison and formed of lineally adjustable sections one of which is provided with a stud, a rotatable control shaft, a crank carried by said shaft, and a pitman extending between said crank and said stud whereby the shaft may be turned for swinging the arms.

In testimony whereof I affix my signature.

WILLIAM LOUIS MERRICK. [L. S.]